United States Patent [19]

Littrell

[11] 4,408,679
[45] Oct. 11, 1983

[54] SOUND ATTENUATOR

[75] Inventor: J. Kerry Littrell, Redmond, Wash.

[73] Assignee: Peabody Spunstrand, Inc., Seattle, Wash.

[21] Appl. No.: 306,190

[22] Filed: Sep. 28, 1981

[51] Int. Cl.³ .......................... F01N 1/10; F01N 7/18
[52] U.S. Cl. .................................. 181/243; 181/246; 181/252
[58] Field of Search ............... 181/224, 226, 228, 244, 181/246, 252, 256, 281, 264, 258, 225, 243; 138/39, 40, 96 R, 153; 55/DIG. 30

[56] References Cited
U.S. PATENT DOCUMENTS

| 3,174,583 | 3/1965 | Giordano | 181/252 |
| 3,507,354 | 4/1970 | Dieckmann et al. | 181/224 |
| 3,540,547 | 11/1970 | Coward, Jr. | 181/225 |
| 3,718,161 | 2/1973 | Woodson | 138/153 |

FOREIGN PATENT DOCUMENTS 563110  7/1944  United Kingdom ............... 181/256

Primary Examiner—Benjamin R. Fuller
Attorney, Agent, or Firm—St. Onge, Steward, Johnston & Reens

[57] ABSTRACT

A sound attenuator for reducing noise and vibration generated by flow of air, particularly air laden with moisture, particulates and corrosive substances. The sound attenuator comprises a tubular housing and a layer of sound attenuating material, such as closed-cell polyurethane foam, removably secured in the interior of the tubular housing. A retaining ring is located at each end portion of the housing and retain the attenuating layer therebetween to avoid substantial longitudinal sliding movement of the attenuating layer by the force of air flowing therethrough. If the attenuating layer becomes abraded by particulates or absorbs an undesirable amount of moisture during use, the sound attenuating layer can be removed and replaced.

10 Claims, 4 Drawing Figures

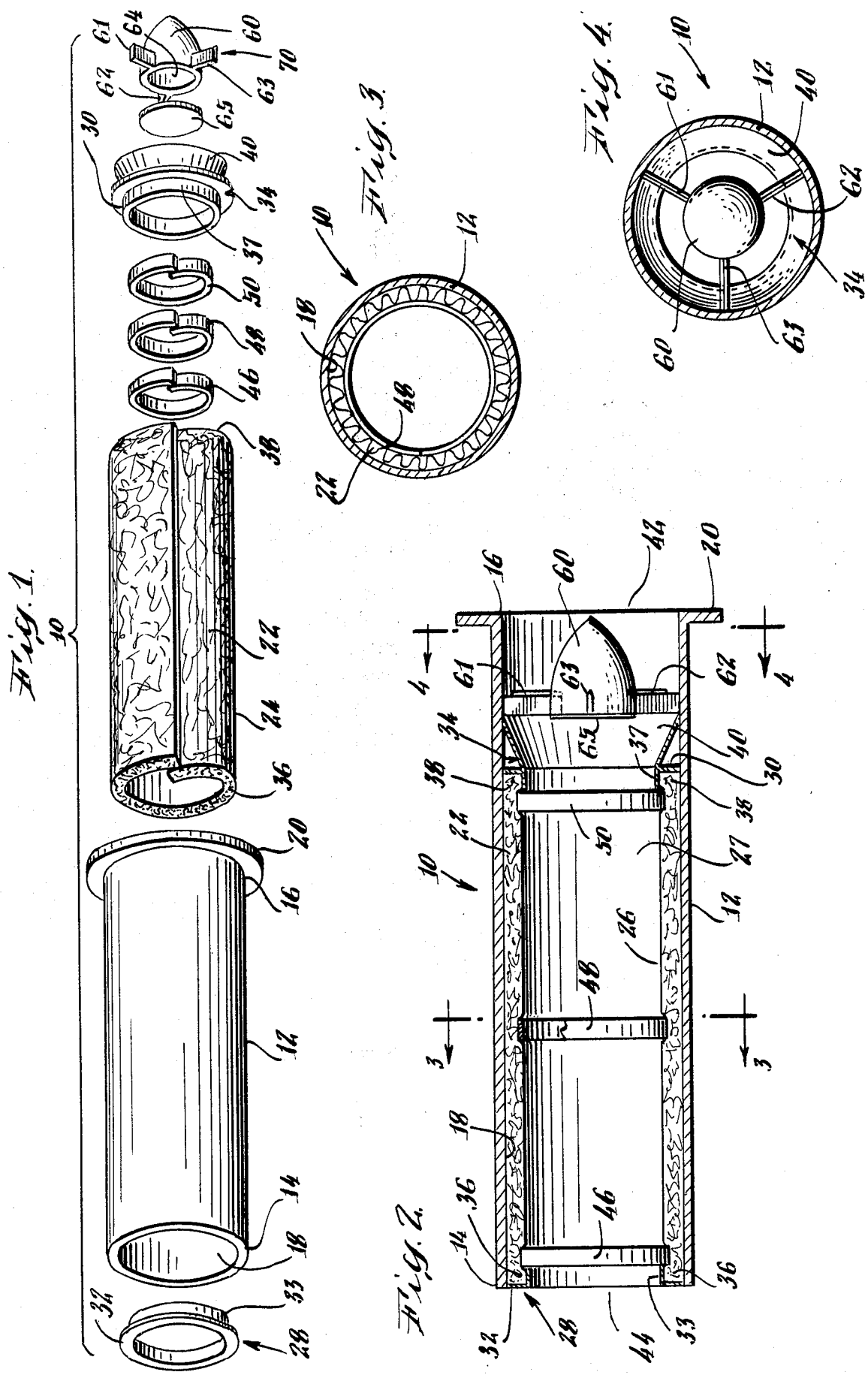

SOUND ATTENUATOR

BACKGROUND OF THE INVENTION

(1) Field of the Invention

The present invention relates to sound attenuating devices which reduce the levels of noise found in air ventilation systems and more specifically air ventilation systems which employ axial flow fans of the type used in mine and industrial ventilation.

(2) Description of the Prior Art

In mine and other industrial environs air is circulated through ventilation ducts by fans, typically by axial air flow fans. Noise created in these systems can be generated from a variety of sources such as the noise and vibration of the fan itself, the noise generated by the flow of air through the fan and its associated ducting, as well as many other noise producing components found in the total ventilation system. In mine ventilation as well as in other industrial applications, the air may be laden with moisture, particulates and corrosive substances.

One prior art type of sound attenuator comprises two concentric tubular members made of metal, the inner tubular member comprising screen mesh. Sound attenuating material such as fiberglass batting or the like is positioned between the concentric tubular members. The tubular members are held in concentric relation by flanges welded at opposite ends of the tubular members. Although this sound attenuator provides for adequate sound attenuation, it has several drawbacks. During use, the sound attenuating material between the tubular members is abraided by the particulates and saturated with moisture in the air, thereby decreasing the sound attenuating properties of the material and replacement of the entire attenuator is then necessary. Moreover, because the members are made principally of metal, the corrosive substances in the air tend to corrode the metal tubular members. Furthermore, this sound attenuator tends to be quite heavy and bulky thus making it difficult to install and handle.

Examples of other prior art sound attenuators may be seen in U.S. Pat. Nos. 650,290; 2,489,048; 3,012,923; 3,507,354; and 3,718,161.

SUMMARY OF THE INVENTION

A sound attenuator in accordance with the present invention comprises a tubular housing having an interior surface and having two end portions. The tubular housing is preferably made of fiberglass reinforced plastic and, more specifically, fiberglass strands impregnated with a thermosetting resin wound tightly in a helical pattern and cured to form a tubular cylinder. Alternatively, the housing may be made by placing fiberglass forms such as chopped strands, rovings, mats, and/or woven fabrics as reinforcements in layers which are impregnated with thermosetting resins and cured to form a tubular housing. Although the principal method of construction of the tubular housings may most likely be either of the aforementioned examples, they could also be formed by various other processes such as compression molding, mat molding, pressure bag molding, vacuum forming, continuous pultrusion, injection molding, sprayup, centrifugal casting, cold molding, comoforms, encapsulation, and/or continuous laminating.

As an alternate to the thermosetting resin, a thermoplastic resin may be used to form the tubular housing. This material may be used with or without reinforcements and can be formed into a tubular housing by applying heat to melt or soften the plastic. Construction of the tubular housing using a thermoplastic resin may be by various processes such as injection molding, continuous laminating, blow molding, rotational molding, vacuum forming, compression molding, encapsulation, continuous pultrusion and/or extrusion.

A layer of sound attenuating material, preferably a closed-cell polyurethane foam layer, has an exterior side thereof positioned in abutting relation with and conforming to the interior surface of the tubular housing. The interior surface of the sound attenuating material defines and axial flow passage through the housing.

An annular ring is fixed to the interior surface at one end portion of the tubular housing and includes a wall extending inwardly from the interior surface of the housing for retaining and preventing the layer of sound attenuating material from sliding in one longitudinal direction under the force of air flowing through the axial flow passage. Similarly, another annular ring is fixed at the opposite end portion of the tubular housing and includes a wall extending inwardly from the interior surface of the housing for retaining and preventing the layer of sound attenuating material from sliding in the opposite longitudinal direction. Thus, the two rings retain the layer therebetween to avoid substantial longitudinal movement of the layer in either direction.

In accordance with one aspect of the invention, at least one of the rings includes an interior transition surface that slowly converges from the end of the tubular housing radially and longitudinally inwardly and that terminates at the wall which retains the attenuating material. This transition surface provides for a smooth funnelling of the air flow into the axial flow passage to thereby reduce turbulence, which in turn, reduces noise and vibration.

In accordance with a further aspect of the invention, the sound attenuator includes at least one, and preferably three, expanding spring hoops for retaining the attenuating layer in abutting relation with and conforming to the interior surface of the tubular housing.

The attenuator may optionally include an air splitting device positioned in the upstream end portion of the axial flow passage for channeling the flow of air outwardly and longitudinally along the inner surface of the sound attenuating material. The air splitting device preferably has a generally conical or bullet-like shape having a maximum diameter less than the inner diameter of the attenuating material to define an annularly shaped flow channel through which the air flow is directed. The splitting device is supported in the axial flow passage by a plurality of support struts that radiate from the splitting device and are secured to the interior of the tubular housing.

The sound attenuator in accordance with the present invention includes a sound attenuating layer which can be replaced should it become contaminated, abraided, or absorb moisture to a degree sufficient to impair the sound attenuating properties of the attenuator. Moreover, because the principal components of the sound attenuator are made from corrosion resistant plastic materials, corrosion of the various components of the attenuator is reduced or eliminated. Thus, an attenuator in accordance with the present invention is suitable for use in hostile environments such as mine and industrial ventilation wherein the attenuator is exposed to flow of air laden with moisture, particulates and corrosive substances. Furthermore, the attenuator in accordance with the present invention is relatively lightweight thus facilitating installation and service of the attenuator. Because the attenuating layer is replaceable, the useful life of the sound attenuator is increased thereby reducing the overall cost of using an attenuator in accordance with the invention. The retaining rings located at either end of the tubular housing provide a simple and effective means for retaining the sound attenuating layer therebetween to prevent substantial longitudinal sliding movement of the layer. In the embodiment of the invention wherein the retaining ring includes a transition surface, smooth funnelling of the air flow into the axial flow passage defined by the attenuating layer reduces turbulence in the air flow, which in turn, reduces noise and vibration. Other advantages of a sound attenuator in accordance with the present invention will be apparent from the following detailed description of the invention with reference to the drawings.

BRIEF DESCRIPTION OF THE DRAWINGS

FIG. 1 is an exploded perspective view of a sound attenuator in accordance with the present invention;

FIG. 2 is a sectional view through the longitudinal axis of the sound attenuator as shown in FIG. 1 assembled;

FIG. 3 is a sectional view along the plane 3—3 of FIG. 2; and

FIG. 4 is a sectional view along the plane 4—4 of FIG. 2.

DETAILED DESCRIPTION OF THE INVENTION

Referring to FIGS. 1-4, a sound attenuator 10 in accordance with the present invention is shown. The sound attenuator includes a tubular housing 12 having a first end portion 14 and a second end portion 16 and having an interior surface 18. Tubular housing 12 is preferably cylindrical but may also have a rectangular or other shape. In accordance with a preferred emmbodiment of the invention, the tubular housing is made from fiberglass reinforced plastic formed by helically winding continuous fiberglass strands impregnated with a thermosetting resin over a cylindrical mandrel. It should be appreciated that the fiberglass reinforced plastic tubular housing is particularly lightweight and has high strength too weight in comparison to metal tubular housings. Moreover, a fiberglass reinforced plastic housing is abrasion and corrosion resistant and is useful in environs where air circulated therethrough is laden with particulates, moisture and corrosive substances. The particular resin may be selected depending on cost, ease of fabrication, corrosion resistance and structural properties of the resulting tubular housing. The use of fiberglass materials is given by way of example and other types of reinforcements may be used such as, for example, graphite, arimid, boron and other synthetic materials.

Alternatively, the housing may be made by placing fiberglass forms such as chopped strands, rovings, mats, and/or woven fabrics as reinforcements in layers which are impregnated with thermosetting resins and cured to form a tubular housing. Although the principal method of construction of the tubular housings may most likely be either of the aforementioned examples, they could also be formed by various other processes such as compression molding, mat molding, pressure bag molding, vacuum forming, continuous pultrusion, injection molding, spray-up, centrifugal casting, cold molding, comoforms, encapsulation, and/or continuous laminating.

As an alternate to the thermosetting resin a thermoplastic resin may be used to form the tubular housing. This material may be used with or without reinforcements and can be formed into a tubular housing by applying heat to melt or soften the plastic. Construction of the tubular housing using a thermoplastic resin may be by various processes such as injection molding, continuous laminating, blow molding, rotational molding, vacuum forming, compression molding, encapsulation, continuous pultrusion and/or extrusion.

The tubular housing 12 may optionally include a circular flange 20 positioned at either or both ends of the tubular housing 12. Flange 20, which is preferably also made of fiberglass reinforced plastic, provides for attachment of the attenuator to an axial flow fan, a mine ventilation duct or other object to which it may be desirable to attach the sound attenuator. The circular flange 20 is attached to the exterior of housing 12 for example by fiberglassing the flange 20 onto the housing 12. As shown is FIGS. 1-4, only one end of the housing includes a flange 20. It should be understood that if desired both ends may include a flange.

A layer 22 of sound attenuating material has an exterior surface 24 positioned in abutting relation with and conforming to the interior surface 18 of the tubular housing. The interior surface 26 of the sound attenuating layer defines an axial flow passage 27 through the attenuator. Although the material of layer 22 may be selcted from various attenuating materials depending on the environment in which the attenuator is to be used, layer 22 preferably comprises a closed-cell polymeric foam material and, most preferably comprises a closed-cell polyurethane foam wherein its interior surface 26 comprises a flexible polyurethane film facing. This sound attenuating layer is positioned within the tubular housing 12 so that the flexible urethane film facing is on the interior surface 26 of the layer. This layer 22 resists moisture absorption and abrasion. However, it should be understood that the attenuating layer 22 is selected for a particular environment in which the sound attenuator is to be used and layers other than closed-cell polyurethane foam may be used. Sound attenuating layers capable of use in a sound attenuator in accordance with the present invention include a polyurethane foam layer with a thin flexible polyurethane film facing on one side thereof sold by Peabody Noise Control under the trade designation KUA-200U. Another sound attenuating layer suitable for use is a polyurethane foam sold by Ferro Corporation, Composites Division under the designation COUSTIFOAM.

In order to retain sound attenuating layer 22 against longitudinal movement in either direction, rings 28 and 34 are provided. Ring 28 is annular in shape and is fixed to the housing 12 at end portion 14. Annular ring 28 includes a wall 32 extending radially inwardly from the interior surface 18 of the housing and providing a stop to prevent the attenuating material from sliding to the left as shown in FIG. 2. The ring 28 also includes cylindrical sleeve 33 which defines a space between it and the interior surface 18 for receiving the end 36 of the attenuating layer 22. Similarly, annular ring 34 is fixed to the interior surface 18 of the housing at end portion 16 and includes a wall 30 extending radially inwardly from the interior surface 18 of the housing and a cylindrical sleeve 37. Ring 34 also includes a transition wall 40, the purpose of which will be described hereinafter.

The rings 28 and 34 are preferably formed of fiberglass reinforced plastic and are secured to the interior surface 18 of the housing by, for example, fiberglassing them onto the interior surface of the housing. Wall of ring 28, 32 and wall 30 of ring 34 retain layer 22 therebetween thereby avoiding substantial longitudinal movement of the layer in either direction under the force of air flowing through the axial flow passage of the attenuator. For example, if layer 22 is urged by the force of the air flowing through the sound attenuator to the lefthand side as shown in FIG. 2, the end surface 36 of attenuating layer 22 (see FIG. 1) will contact the wall 32 of annular ring 28. Similarly, if the sound attenuating layer 22 is urged to the right as shown in FIG. 2, the opposite end 38 of layer 22 will contact wall 30 of annular ring 34.

In accordance with one aspect of the invention ring 34 includes an interior transition surface 40 that slowly converges from within the housing radially and longitudinally inwardly and that terminates in retaining wall 30. Surface 40 is preferably a segment of a cone having its axis on the longitudinal axis of the sound attenuator. The transition surface 40 provides for a smooth funnelling of the air flow into the axial flow passage to thereby reduce air turbulence, which in turn reduces noise and vibration in the transition area. Cylindrical sleeve 37 provides for a smooth transition between the ring 34 and the end 38 of attenuating layer 22. Otherwise the end 38 might cause turbulence if it extended into the axial flow passage 27.

The sound attenuator 10 is manufactured by forming tubular housing 12 and securing annular rings 28 and 34. If desired, flanges on either end or both ends of the housing may be attached. As shown in FIGS. 1 and 2, the sound attenuating material is rolled sufficiently tight to enable it to pass through the openings 42 and 44 at either end of the housing. Once the attenuating layer 22 is positioned inside the housing it is allowed to unroll to conform to the interior surface 18 of the tubular housing.

The attenuating layer is preferably resilient so that when it is rolled, it has a tendency to unroll when it is not held in a rolled condition. At least one and preferably three, expanding spring hoops 46, 48 and 50 are provided for retaining the attenuating layer 22 in abutting relation with and conforming to the interior surface 18 of the housing. These spring hoops are preferably made of spring steel. However, it should be understood that other devices for securing the layer in place may be used.

The attenuator may optionally include an air splitting device 70 positioned in the upstream end portion of the axial flow passage 27. The splitting device 70 channels the flow of air outwardly and along the inner surface 26 of the sound attenuating material 22. The splitting device 70 thereby forces a greater amount of air flow to be exposed to the attenuating material 22 thus further reducing the noise level.

The air splitting device 70 is made from the same thermosetting and/or thermoplastic materials as described for the housing 12. The device 70 includes radiating support struts 61, 62, and 63 which position the device 70 in the center of the axial flow passage 27. The struts 61, 62, and 63 are fabricated from either thermosetting and/or thermoplastic materials. The leading edges of the struts are tapered at an angle to reduce the drag which could result in additional noise generation within the device as well as increase the statid pressure the fan has to overcome. The cavity 64 of the air splitting device 70 may be filled with a sound deadening material such as but not limited to a polyurethane foam material or depending on application, it could remain unfilled. The air splitting device 70 includes a base plate 65 which closes off the down stream end of the air splitting device. It should be understood, however, that the splitting device is optional and may be simply deleted.

The sound attenuator 10 described above is suitable for use in mine ventilation and other industrial environs wherein air laden with particulates, moisture and corrosive substances is circulated. The attenuating layer 22 may be replaced if it becomes abraided, corroded or absorbs a sufficient amount of moisture to reduce its sound attenuating properties. The layer 22 may be replaced by removing hoops 46, 48, 50 and then removing and replacing attenuating layer 22.

An attenuator in accordance with the present invention is resistant to corrosive substances in the air circulated therethrough. The attenuator is particularly lightweight and easy to install and manipulate.

It should be understood that although specific embodiments of the invention have been described herein in detail, such description is for purposes of illustration only and modifications may be made thereto by those skilled in the art within the scope of the invention.

What is claimed is:

1. A lightweight, corrosion resistant sound attenuator having replaceable sound attenuating material which may become contaminated, abraided or absorb moisture during use, the attenuator comprising:
  a tubular housing comprising a lightweight plastic material, having two end portions and having an interior surface;
  a layer of sound attenuating material having an outer side positioned in abutting relation with said interior surface of the tubular housing, said layer having an interior surface defining an axial flow passage through the housing, said layer being removeable to provide for replacement thereof;
  a first annular ring inserted in and fixed to the interior surface of said housing at one end portion, said ring having a wall extending inwardly from the interior surface of the housing, said wall having an inward end, said wall retaining said layer against longitudinal sliding movement in one direction, said first ring including an interior transition surface converging from the interior surface of said housing radially and longitudinally inwardly to said inward end of said retaining wall, said first ring including a cyclindrical sleeve extending longitudinally from said inward end of said retaining wall to define a slot between it and said interior surface of said housing for retaining the end of said layer of sound attenuating material, said sleeve providing a smooth transition betwen said ring and the end of said layer;
  a second annular ring fixed to the interior surface of the housing at the other end portion and having a wall extending inwardly from the interior surface of the housing for retaining said layer against longitudinal sliding movement in an opposite direction;
  means for retaining said attenuating layer in abutting relation with the interior surface of the housing, said retaining means being removeable to provide for replacement of said sound attenuating layer.

2. A sound attenuator according to claim 1 wherein said means for retaining said attenuating layer in abutting relation with said interior surface of the housing comprises at least one expanding spring hoop having a surface contacting and urging the interior surface of said attenuating layer radially outwardly.

3. A sound attenuator according to claim 1 wherein said tubular housing comprises fiberglass reinforced plastic.

4. A sound attenuator according to claim 1 wherein said housing includes a flange located at at least one end portion of the housing and extending radially outwardly.

5. A sound attenuator according to claim 1 wherein said sound attenuating layer comprises closed-cell polymeric foam.

6. A sound attenuator according to claim 5 wherein said polymeric closed-cell foam comprises polyurethane foam.

7. A sound attenuator layer according to claim 6 wherein said attenuating layer has on the interior surface thereof a polyurethane film facing.

8. A sound attenuator according to claim 1 and further including means for channelling said air flow outwardly and longitudinally along said interior surface of said attenuating layer.

9. A sound attenuator according to claim 8 wherein said channelling means comprises a splitting device having a diameter less than the inner diameter of said attenuating layer to define an annularly shaped flow channel.

10. An attenuator according to claim 1 wherein said second annular ring includes a cylindrical sleeve extending longitudinally from said inward end of said retaining wall to define a slot between it and said interior surface of the housing for retaining the end of said layer of sound attenuating material.

* * * * *